US005472482A

United States Patent [19]
Willits et al.

[11] Patent Number: 5,472,482
[45] Date of Patent: Dec. 5, 1995

[54] DILUTABLE LIQUID SURFACTANT COMPOSITION USEFUL AS RELEASE AID AND GLAZE EXTENDER

[75] Inventors: Melissa Willits, Cordova; Leonard Walp; Michael Whitlock, both of Memphis, all of Tenn.

[73] Assignee: Witco Corporation, New York, N.Y.

[21] Appl. No.: 260,885

[22] Filed: Jun. 16, 1994

[51] Int. Cl.$^6$ .............................. A23L 1/48; A23D 9/00; C08L 91/00
[52] U.S. Cl. .............................. 106/2; 106/244; 106/252; 426/811; 426/609; 426/601; 426/602; 426/604; 426/607; 426/612
[58] Field of Search .............................. 106/2, 244, 252; 426/811, 609, 601, 602, 604, 607, 612

[56] References Cited

U.S. PATENT DOCUMENTS

| | | | |
|---|---|---|---|
| 3,785,993 | 1/1974 | Langhans | 426/24 |
| 3,859,445 | 1/1975 | Langhans | 426/24 |
| 3,914,453 | 10/1975 | Gawrilow | 426/601 |

*Primary Examiner*—C. Melissa Bonner
*Attorney, Agent, or Firm*—Scully, Scott, Murphy & Presser

[57] ABSTRACT

Disclosed are compositions of one or more glycerol monoesters of fatty acid; one or more fatty acid esters of polyoxyethylenated glycerol, hexitan, hexitol, or isohexide; one or more polymeric glycerol esters of fatty acid; and edible oil; which are dilutable with water to form a release agent useful in, e.g., baking operations.

32 Claims, No Drawings

DILUTABLE LIQUID SURFACTANT COMPOSITION USEFUL AS RELEASE AID AND GLAZE EXTENDER

BACKGROUND OF THE INVENTION

The present invention relates to release agents, that is, compositions useful in reducing or eliminating adhesion between the surfaces of two separate, normally solid objects. Release agents customarily are found to be useful when two solid surfaces are placed in close proximity to each other and are subjected to operations or conditions which tend to urge one surface toward the other. Interposing the release agent between the surfaces reduces or eliminates the adhesion which would otherwise make separation of the surfaces difficult or impossible.

The present invention relates in particular to release agents useful in the food industry and/or particularly in the baking industry. Breads and other bakery products are customarily baked in pans having sides and a bottom whose surfaces are usually coated with a hard, adherent glaze designed to be a permanent part of the pan. The glaze aids in obtaining the release of the bread or other bakery product from the pan after baking. However, after repeated uses the glaze on the pans can become thinner and/or can be damaged or chipped during handling of the pan, resulting in the glaze having reduced effectiveness and resulting in increased adhesion of the baked product to the pan. Even when the glaze has not suffered reduced effectiveness through use, the glaze itself is often not sufficient to allow products to release sufficiently quickly from the pan.

Traditionally, combinations of edible oils and mineral oils have been used as release agents to enhance the release properties of the glaze and to extend the length of time between reglazing operations. Other surfactant products have also been tried. However, the oils and other surfactants that have been used up to now suffer from drawbacks. For instance, the release agent may undesirably affect the taste, texture or appearance of the baked product. Often, the oil used as release agent is too expensive to permit the necessary frequency of use economically. In addition, many liquid surfactant compositions prove to be too fluid, such that when they are applied to the sides of the pan, the composition runs down the sides and collects in the bottom; thus, insufficient amounts of release agents are left on the sides of the pan where they are needed, and the excessive amounts of release agents accumulating in the bottom of the pan can damage the quality of the baked product.

The challenge of providing a release agent useful in bakery industry applications is complicated by several constraints. For instance, of course, the product has to be absolutely safe for ingestion by the consumer. The product also needs to be tasteless, or else to impart an innocuous or unnoticeable taste. In addition, the product should be easily applied and then easily removed when removal is desired upon cleaning of the baking pan. The components should also be economical, readily formulated, and readily available in the commercial chemical market. Also, the product needs to be able to withstand the conditions of usage encountered in baking operations, including cycles of temperature from room temperature to several hundred degrees above room temperature, repeatedly, without suffering any degradation of chemical composition and without suffering physical degradation such as phase separation, crystallization, and the like.

Accordingly, there is still a need for a surfactant composition useful as a release agent in the baking industry having the advantages described herein while avoiding the disadvantages enumerated hereinabove.

BRIEF SUMMARY OF THE INVENTION

In one aspect the present invention resides in a liquid composition comprising (a) about 25 wt. % to about 50 wt. % of a glycerol monoester component selected from the group consisting of glycerol monoesters of fatty acids containing 12 to 22 carbon atoms;

(b) about 18 wt. % to about 32 wt. % of a polyoxyethylene ester component selected from the group consisting of monoesters of fatty acids containing 12 to 22 carbon atoms with polyoxyethylenated glycerol, hexitan, hexitol and isohexide;

(c) about 1 wt. % to about 10 wt. % of a polymeric glycerol ester component selected from the group consisting of monoesters, diesters, triesters, tetraesters and pentaesters of polymeric glycerol having a degree of polymerization of 2 to 10 with one to five fatty acids containing 12 to 22 carbon atoms; and (d) about 5 wt. % to about 50 wt. % of one or more edible oils.

Another aspect of the present invention is a concentrate having the foregoing composition and containing water in an amount up to about 10 wt. %.

Yet another aspect of the present invention resides in a liquid composition composed of a surfactant portion and water, wherein the surfactant portion comprises the one or more glycerol monoesters, the one or more polyoxyethylene esters, the one or more polymeric glycerol esters, and the one or more edible oils, and optionally water, typically up to about 20 wt. % or preferably up to about 10 wt. %. Thus, the present invention contemplates liquid compositions ready to use as release aids and also contemplates concentrates which are readily dilutable with water to provide the final ready-to-use product.

The present invention further resides in a method of reducing the adhesivity of a surface, comprising applying to the surface a release agent composed of a liquid composition having the foregoing description.

DETAILED DESCRIPTION OF THE INVENTION

As indicated, the present invention resides in a carefully optimized combination of ester and oil components in water. The invention is a stable, clear liquid surfactant blend which when diluted with water and sprayed or otherwise applied to the surfaces of baking pans, enhances the release properties of the baked product from the baking pan.

The fatty acid component of the various esters described herein includes any residue of a fatty acid, saturated or unsaturated, which contains 12 to 22 carbon atoms. The unsaturated fatty acid moieties may contain from 1 to 6 carbon-carbon double bonds. Examples of fatty acids whose esters are useful in the various components of the compositions of the present invention include stearic, palmitic, lauric, oleic, behenic, arachidonic, and myristic acids. Other examples include linoleic, linolenic, ricinoleic, gadoleic, cetoleic, and erucic acids. As is apparent from the description throughout, mixtures of esters formed from more than one of such acids can be used.

One component of the composition of the present invention is a glycerol monoester component, which comprises the glycerol monoester of one or more fatty acids containing 12 to 22 carbon atoms. This component is believed to contribute emulsification of the oil components with the polyglycerol ester component of the compositions of the present invention. Esters formed from mixed acids are useful as well. Examples include glycerol esters of acids of saponified lard and of saponified tallow.

This component should be present in amounts of about 25 wt. % to about 50 wt. % of the liquid composition, and preferably about 30 wt. % to about 40 wt. %. These percentages are with respect to the undiluted composition, which contains no water or up to about 20 wt. % water. The composition whose content is expressed as these percentage ranges is preferably diluted up to 100:1 with water before use.

The liquid composition of the present invention can also, optionally, contain a diester component which comprises one or more glycerol diesters of one or more fatty acids containing 12 to 22 carbon atoms. It is preferred that, when such a diester component is present, the glycerol monoester component and the diester component together constitute about 25 wt. % to about 50 wt. %, and preferably about 30 wt. % to about 40 wt. %, of the undiluted liquid composition of the present invention.

Another component of the liquid composition of the present invention is a polyoxyethylene ester component which is selected from the group consisting of monoesters of fatty acids containing 12 to 22 carbon atoms with polyoxyethylenated glycerol, hexitan, hexitol and/or isohexide. Preferably, this component includes the ethoxylated fatty acid monoesters, diesters and triesters of sorbitol, mannitol, dulcitol and iditol; and the monoesters and diesters of their corresponding mono- and dianhydrides. A preferred group of compounds is those wherein the hexitol is sorbitol or the anhydride sorbitan or isosorbide. The polyoxyethylene moiety preferably contains about 10 to 25 ethylene oxide units per molecule.

Representative of the polyoxyethylene-substituted fatty acid esters useful as this component are polyoxyethylene sorbitol distearate, polyoxyethylene sorbitan monostearate, polyoxyethylene isosorbide dipalmitate, polyoxyethylene sorbitan distearate, polyoxyethylene isosorbide monooleate, polyoxyethylene sorbitol trilaurate, polyoxyethylene sorbitan dibehenate, polyoxyethylene isosorbide monolinoleate, polyoxyethylene sorbitan monolaurate, polyoxyethylene mannitan monooleate, polyoxyethylene sorbitan monopalmitate, polyoxyethylene sorbitol oleate, polyoxyethylene iditan monostearate, as well as other similar ethoxylated fatty acid esters of hexitols, hexitans, and isohexides or the fatty acid esters of ethoxylated hexitols, hexitans, and isohexides.

The preferred example of this component is known conventionally as polyoxyethylene (20) sorbitan monostearate.

This component of the composition of the present invention is believed to contribute emulsification of the composition and to facilitate the ready dilutability of the composition with water.

This component is present in amounts of about 18 wt. % to about 32 wt. % of the undiluted composition, and preferably in amounts of about 20 wt. % to about 30 wt. % thereof.

Another component of the composition of the presently claimed invention is a polymeric glycerol ester component selected from the group consisting of monoesters, diesters, triesters, tetraesters, and pentaesters of polymerized glycerol containing 2 to 10 repeating glycerol units, esterified with one to five acids containing 12 to 22 carbon atoms. Recognizing that the chemical formula of glycerol itself is $C_3H_5(OH)_3$, the term polymeric glycerol or polymerized glycerol as used herein refers to compounds wherein 2 to 10 glycerol molecules are connected together through oxygen atoms, thus corresponding to the empirical formula $H-(OC_3H_4(OH)_2)_{DP}-OH$ wherein DP, the degree of polymerization, is for purposes of the present invention an integer from 2 to 10. The esters of polymeric glycerol employed herein comprise esters formed with 1 to 5 (preferably 1, 2, or 3) moles of fatty acid (containing 12 to 22 carbon atoms) per mole of polymeric glycerol, recognizing that each molecule of polymeric glycerol contains [2.(DP)+1] hydroxyl groups to which fatty acid residues can be esterified.

The polymeric glycerol ester component preferably comprises about 1 wt. % to about 10 wt. % of the undiluted compositions of the present invention, it being recognized that mixtures of more than one such polymeric glycerol ester corresponding to the above definition can be used in the present invention. This component is believed to contribute to the ability of the release agent formulation to adhere where it is applied to a surface of a breadpan or other article.

Another component of the compositions of the present invention is one or more edible oils, preferably present in amounts of about 5 to about 50 wt. % and more preferably about 25 to about 40 wt. % thereof. Oils useful in this invention include any natural or synthetic edible oils, such as cottonseed, safflower, corn, soybean, coconut, peanut, and hydrogenated oils, preferably those which are liquid at temperatures above 35° F. Soybean oil is a preferred oil.

Examples of each of the foregoing ingredients are available commercially, or can be synthesized to the requisite degree of purity using standard synthetic techniques within the capability of the chemist.

One aspect of the present invention is liquid compositions comprising the four ester and oil components enumerated hereinabove. The preferred manner of making such compositions is by mixing together in a suitable vessel the glycerol monoester (optionally including the glycerol diester referred to herein), the polyoxyethylene ester component, and an amount of water sufficient to clarify the final product, and then stirring them together with the polymeric glycerol ester component and then the edible oil component, under sufficient shear to create a monophasic liquid composition. If desired, moderate heat can be applied during the mixing and stirring stages. The resulting product is a clear liquid which is stable against phase separation over an extended period of time. If desired, for instance to improve the phase stability and/or the dilutability of the concentrate, the concentrate can be formulated as described hereinabove but also including water. The amount of water is not critical but is generally up to about 20 wt. % of the concentrate and more preferably up to about 10 wt %. The preparation is as described hereinabove, except that the water can be added at the operator's option before or during stirring together of the other ingredients.

The resulting composition (with or without the water) is useful as a release agent without dilution, but it is also useful as a concentrate which can be diluted with water to form a useful and effective release agent. The amount of water with which to dilute the concentrate is a matter of choice to the operator, depending on the degree of coverage afforded by the final product balanced against the amount of the components which the operator may desire to use per application. The dilution employed can range to as high as 100:1

(parts by weight, water:concentrate).

The user, following dilution of the concentrate to the desired final ingredient strength, can then proceed to apply the release agent in any conventional manner to the surface(s) of interest. Typical manners of application include spraying the composition onto the surfaces desired or immersing the surfaces in a bath or tank of the composition. Dilution of the concentrate with water is preferred to ensure even distribution of the oil components over the surface being treated, while requiring use of only low levels of the components. Generally, a thin layer is adequate. For example, a conventional 1.5-pound bread loaf pan can be adequately treated with 0.25 to 0.75 ounces of diluted product.

The object to whose surfaces the release agent has been applied is then used in any way that is desired. Following separation of the surfaces in question, as facilitated by the release agent—for example, following removal of the baked product from the thus-treated breadpan—the release agent can, if desired, be easily removed from the surfaces in question by washing with water or with a water-borne detergent.

The release agents prepared in accordance with the present invention exhibit a number of advantages not heretofore apparent. They perform admirably well as release agents, reducing the adhesivity of a surface and facilitating separation of surfaces in contact even after exposure to the conditions encountered in commercial baking operations. The composition is sufficiently adhesive wherever it is applied, so that it does not run off of non-horizontal surfaces nor collect at the bottoms of breadpans and the like. The release agent composition is completely safe to the consumer, which permits its use in applications such as the preparation of products to be eaten.

The release agent compositions are also notably phase-stable over a prolonged period of time, and retain their properties as release agents as well as their phase stability even over a number of cyclings of temperature between room temperature and baking temperatures, e.g., on the order of several hundred degrees Fahrenheit. The compositions also provide these advantages while requiring the use of remarkably smaller amounts of active ingredients compared to prior release agent compounds. The agents can also be removed rapidly from the surfaces in question when such removal is required.

The following examples illustrate numerous advantageous embodiments of liquid compositions prepared in accordance with the present invention which have been formulated as concentrates which upon further dilution with water produce useful, effective release agents. In each of the following examples, the indicated ingredients in the indicated amounts were added together into a vessel and were stirred together to form a clear, monophasic liquid product.

Each of the following examples includes one component identified by two numbers and a letter, such as "6-1-O" in Example 1. In each case, the component is a polymeric glycerol ester of a fatty acid containing 12 to 22 carbon atoms. The first number is "DP", the number of repeating glycerol units. The second number is the number of fatty acid chains esterified with the polymeric glycerol. The letter is the initial of the fatty acid(s) with which the product is esterified: O=oleic, S= stearic, L= lauric.

Example 1

| | |
|---|---|
| Glycerol ester of acids of saponified tallow (54% weight alpha monoester-89% unsaturated) | 32% |
| Polyoxyethylene (20) sorbitan monostearate | 22% |
| Soybean Oil | 35% |
| Water | 6% |
| 6-1-O | 5% |

Example 2

| | |
|---|---|
| Glycerol ester of acids of saponified tallow (54% weight alpha monoester-89% unsaturated) | 32% |
| Polyoxyethylene (20) sorbitan monostearate | 22% |
| Soybean Oil | 35% |
| Water | 6% |
| 8-2-O | 5% |

Example 3

| | |
|---|---|
| Glycerol esters of $C_{12}$–$C_{22}$ fatty acids (55% weight alpha monoester-Iodine Value 37%) | 36% |
| Polyoxyethylene (20) sorbitan monostearate | 24% |
| Soybean Oil | 35% |
| 6-1-O | 5% |

Example 4

| | |
|---|---|
| Glycerol esters of $C_{12}$–$C_{22}$ fatty acids (55% weight alpha monoester-Iodine Value 37%) | 36% |
| Polyoxyethylene (20) sorbitan monostearate | 24% |
| Soybean Oil | 35% |
| 8-3-O | 5% |

Example 5

| | |
|---|---|
| Glycerol ester of acids of saponified tallow (54% weight alpha monoester-89% unsaturated) | 32% |
| Polyoxyethylene (20) sorbitan monostearate | 22% |
| Cottonseed Oil | 27% |
| Water | 9% |
| 6-1-O | 10% |

Example 6

| | |
|---|---|
| Glycerol ester of acids of cottonseed oil (54% weight alpha monoester-89% unsaturated) | 32% |
| Polyoxyethylene (20) sorbitan monostearate | 22% |
| Safflower oil | 34% |
| Water | 7% |
| 6-1-O | 5% |

Example 7

| | |
|---|---|
| Glycerol ester of acids of saponified lard (54% weight alpha monoester-89% unsaturated) | 32% |
| Polyoxyethylene (20) sorbitan monostearate | 22% |

-continued

Example 7

| | |
|---|---|
| Soybean oil | 35% |
| Water | 6% |
| 6-1-O | 5% |

Example 8

| | |
|---|---|
| Glycerol ester of acids of saponified tallow | 32% |
| (54% weight alpha monoester-89% unsaturated) | |
| Polyoxyethylene (20) sorbitan monostearate | 22% |
| Soybean Oil | 32% |
| Water | 6% |
| 6-1-O | 5% |
| Propylene Glycol | 3% |

Exapmle 9

| | |
|---|---|
| Glycerol ester of acids of saponified tallow | 32% |
| (54% weight alpha monoester-89% unsaturated) | |
| Polyoxyethylene (20) sorbitan monostearate | 22% |
| Soybean Oil | 35% |
| Water | 6% |
| 8-1-O | 5% |

Example 10

| | |
|---|---|
| Glycerol esters of $C_{12}$–$C_{22}$ fatty acids | 36% |
| (55% weight alpha monoester-Iodine Value 37%) | |
| Polyoxyethylene (20) sorbitan monostearate | 24% |
| Soybean Oil | 35% |
| 8-1-O | 5% |

Example 11

| | |
|---|---|
| Glycerol esters of $C_{12}$–$C_{22}$ fatty acids | 36% |
| (55% weight alpha monoester-Iodine Value 37%) | |
| Polyoxyethylene (20) sorbitan monostearate | 24% |
| Soybean Oil | 35% |
| 8-3-O | 5% |

Example 12

| | |
|---|---|
| Glycerol ester of acids of saponified tallow | 32% |
| (54% weight alpha monoester-89% unsaturated) | |
| Polyoxyethylene (20) sorbitan monostearate | 22% |
| Cottonseed Oil | 27% |
| Water | 9% |
| 8-1-O | 10% |

Example 13

| | |
|---|---|
| Glycerol ester of acids of cottonseed oil | 32% |
| (54% weight alpha monoester-89% unsaturated) | |
| Polyoxyethylene (20) sorbitan monostearate | 22% |
| Safflower Oil | 34% |
| Water | 7% |
| 8-1-O | 5% |

Example 14

| | |
|---|---|
| Glycerol ester of acids of saponified lard | 32% |
| (54% weight alpha monoester-89% unsaturated) | |
| Polyoxyethylene (20) sorbitan monostearate | 22% |
| Soybean Oil | 35% |
| Water | 6% |
| 8-1-O | 5% |

Example 15

| | |
|---|---|
| Glycerol ester of acids of saponified tallow | 32% |
| (54% weight alpha monoester-89% unsaturated) | |
| Polyoxyethylene (20) sorbitan monostearate | 22% |
| Soybean Oil | 32% |
| Water | 6% |
| 8-1-O | 5% |
| Propylene Glycol | 3% |

Example 16

| | |
|---|---|
| Glycerol ester of acids of saponified tallow | 32% |
| (54% weight alpha monoester-89% unsaturated) | |
| Polyoxyethylene (20) sorbitan monostearate | 22% |
| Soybean Oil | 35% |
| Water | 6% |
| 10-1-O | 5% |

Example 17

| | |
|---|---|
| Glycerol esters of $C_{12}$–$C_{22}$ fatty acids | 36% |
| (55% weight alpha monoester-Iodine Value 37%) | |
| Polyoxyethylene (20) sorbitan monostearate | 24% |
| Soybean Oil | 35% |
| 10-1-O | 5% |

Example 18

| | |
|---|---|
| Glycerol ester of acids of saponified tallow | 32% |
| (54% weight alpha monoester-89% unsaturated) | |
| Polyoxyethylene (20) sorbitan monostearate | 22% |
| Cottonseed Oil | 25% |
| Water | 6% |
| 10-1-O | 10% |

Example 19

| | |
|---|---|
| Glycerol ester of acids of cottonseed oil | 32% |
| (54% weight alpha monoester-89% unsaturated) | |
| Polyoxyethylene (20) sorbitan monostearate | 22% |
| Safflower Oil | 34% |
| Water | 7% |

-continued

Example 19

| | |
|---|---|
| 10-1-O | 5% |

Example 20

| | |
|---|---|
| Glycerol ester of acids of saponified lard (54% weight alpha monoester-89% unsaturated) | 32% |
| Polyoxyethylene (20) sorbitan monostearate | 22% |
| Soybean Oil | 35% |
| Water | 6% |
| 10-1-O | 5% |

Example 21

| | |
|---|---|
| Glycerol ester of acids of saponified tallow (54% weight alpha monoester-89% unsaturated) | 32% |
| Polyoxyethylene (20) sorbitan monostearate | 22% |
| Soybean Oil | 32% |
| Water | 6% |
| 10-1-O | 5% |
| Propylene Glycol | 3% |

Example 22

| | |
|---|---|
| Glycerol ester of acids of saponified tallow (54% weight alpha monoester-89% unsaturated) | 32% |
| Polyoxyethylene (20) sorbitan monostearate | 22% |
| Soybean Oil | 35% |
| Water | 6% |
| 4-1-O | 5% |

Example 23

| | |
|---|---|
| Glycerol ester of acids of saponified tallow (54% weight alpha monoester-89% unsaturated) | 44% |
| Polyoxyethylene (20) sorbitan monostearate | 30% |
| Soybean Oil | 9% |
| Water | 8% |
| 8-3-O | 3% |
| 8-1-S | 3% |
| Mono and diglycerides of $C_{12}$–$C_{22}$ fatty acids | 3% |

Example 24

| | |
|---|---|
| Glycerol ester of acids of saponified tallow (54% weight alpha monoester-89% unsaturated) | 32% |
| Polyoxyethylene (20) sorbitan monostearate | 22% |
| Soybean Oil | 35% |
| Water | 6% |
| 2-1-L | 5% |

Example 25

| | |
|---|---|
| Glycerol ester of acids of saponified tallow (90% weight alpha monoester-89% unsaturated) | 32% |
| Polyoxyethylene (20) sorbitan monostearate | 22% |

Example 25

| | |
|---|---|
| Soybean Oil | 35% |
| Water | 6% |
| 6-1-O | 5% |

What is claimed is:

1. A liquid pan release agent composition comprising:
   (a) about 25 wt. % to about 50 wt. % of a glycerol monoester component selected from the group consisting of glycerol monoesters of fatty acids containing 12 to 22 carbon atoms and mixtures thereof;
   (b) about 18 wt. % to about 32 wt. % of a polyoxyethylene ester component selected from the group consisting of monoesters of fatty acids containing 12 to 22 carbon atoms with polyoxyethylenated glycerol, hexitan, hexitol, and isohexide and mixtures thereof;
   (c) about 1 wt. % to about 10 wt. % of a polymeric glycerol ester component selected from the group consisting of monoesters, diesters, triesters, tetraesters, and pentaesters of polymeric glycerol having a degree of polymerization of 2 to 10 with one to five fatty acids containing 12 to 22 carbon atoms, and mixtures thereof; and
   (d) about 5 wt. % to about 50 wt. % of one or more edible oils.

2. A liquid composition according to claim 1, further comprising one or more glycerol diesters selected from the group consisting of glycerol diesters of fatty acids containing 12 to 22 carbon atoms, wherein said one or more glycerol diesters and said glycerol monoester component together comprise about 25 wt. % to about 50 wt. % of said liquid composition.

3. A liquid composition according to claim 1 wherein said polyoxyethylene ester component is selected from the group consisting of monoesters of fatty acids containing 12 to 22 carbon atoms with sorbitol, sorbitan, or isosorbide ethoxylated with 10 to 25 moles of ethylene oxide per mole.

4. A liquid composition according to claim 2 wherein said polyoxyethylene ester component is selected from the group consisting of monoesters of fatty acids containing 12 to 22 carbon atoms with sorbitol, sorbitan, or isosorbide ethoxylated with 10 to 25 moles of ethylene oxide per mole.

5. A liquid composition according to claim 1 further comprising water in an amount up to about 10 wt. % of said composition.

6. A liquid composition according to claim 2 further, comprising water in an amount up to about 10 wt. % of said composition.

7. A liquid composition according to claim 4 further comprising water in an amount up to about 10 wt. % of said composition.

8. A liquid pan release agent composition comprising
   (A) a mixture of
      (a) about 25 wt. % to about 50 wt. % of a glycerol monoester component selected from the group consisting of glycerol monoesters of fatty acids containing 12 to 22 carbon atoms and mixtures thereof;
      (b) about 18 wt. % to about 32 wt. % of a polyoxyethylene ester component selected from the group consisting of monoesters of fatty acids containing 12 to 22 carbon atoms with polyoxyethylenated glycerol, hexitan, hexitol, and isohexide, and mixtures thereof;
      (c) about 1 wt. % to about 10 wt. % of a polymeric glycerol ester component selected from the group consisting of monoesters, diesters, triesters, tetraesters, and pentaesters of polymeric glycerol having a degree of polymerization of 2 to 10 with one to five fatty acids containing 12 to 22 carbon atoms, and mixtures thereof;

(d) about 5 wt. % to about 50 wt. % of one or more edible oils, and (B) water, wherein the weight ratio of component (B) to component (A) is up to 100:1.

9. A liquid composition according to claim 8 wherein said component (A) further comprises one or more glycerol diesters of fatty acids containing 12 to 22 carbon atoms, wherein said one or more glycerol diesters and said glycerol monoester component together comprise about 25 wt. % to about 50 wt. % of said liquid composition.

10. A liquid composition according to claim 8 wherein said polyoxyethylene ester component is selected from the group consisting of monoesters of fatty acids containing 12 to 22 carbon atoms with sorbitol, sorbitan, or isosorbide ethoxylated with 10 to 25 moles of ethylene oxide per mole.

11. A liquid pan release agent composition comprising (A) a mixture of (a) about 25 wt. % to about 50 wt. % of a glycerol monoester component selected from the group consisting of glycerol monoesters of fatty acids containing 12 to 22 carbon atoms and mixtures thereof;

(b) about 18 wt. % to about 32 wt. % of a polyoxyethylene ester component selected from the group consisting of monoesters of fatty acids containing 12 to 22 carbon atoms with polyoxyethylenated glycerol, hexitan, hexitol, and isohexide, and mixtures thereof;

(c) about 1 wt. % to about 10 wt. % of a polymeric glycerol ester component selected from the group consisting of monoesters, diesters, triesters, tetraesters, and pentaesters of polymeric glycerol having a degree of polymerization of 2 to 10 with one to five fatty acids containing 12 to 22 carbon atoms, and mixtures thereof;

(d) about 5 wt. % to about 50 wt. % of one or more edible oils; and water in an amount up to about 10 wt. % of said mixture; and said liquid composition further comprising (B) an additional amount of water, wherein the weight ratio of component (B) to component (A) is up to 100:1.

12. A liquid composition according to claim 11 wherein said component (A) further comprises one or more glycerol diesters of fatty acids containing 12 to 22 carbon atoms, wherein said one or more glycerol diesters and said glycerol monoester component together comprise about 25 wt. % to about 50 wt. % of said liquid composition.

13. A liquid composition according to claim 11 wherein said polyoxyethylene ester component is selected from the group consisting of monoesters of fatty acids containing 12 to 22 carbon atoms with sorbitol, sorbitan, or isosorbide ethoxylated with 10 to 25 moles of ethylene oxide per mole.

14. A liquid composition according to claim 1 wherein said polyoxyethylene ester component is polyoxyethylene(20)sorbitan monostearate.

15. A liquid composition according to claim 2 wherein said polyoxyethylene ester component is polyoxyethylene(20)sorbitan monostearate.

16. A liquid composition according to claim 8 wherein said polyoxyethylene ester component is polyoxyethylene(20)sorbitan monostearate.

17. A liquid composition according to claim 9 wherein said polyoxyethylene ester component is polyoxyethylene(20)sorbitan monostearate.

18. A liquid composition according to claim 11 wherein said polyoxyethylene ester component is polyoxyethylene(20)sorbitan monostearate.

19. A liquid composition according to claim 12 wherein said polyoxyethylene ester component is polyoxyethylene(20)sorbitan monostearate.

20. A method of reducing the adhesivity of a baking surface comprising applying to said surface an adhesivity reducing effective amount of a liquid composition comprising (a) about 25 wt. % to about 50 wt. % of a glycerol monoester component selected from the group consisting of glycerol monoesters of fatty acids containing 12 to 22 carbon atoms and mixtures thereof;

(b) about 18 wt. % to about 32 wt. % of a polyoxyethylene ester component selected from the group consisting of monoesters of fatty acids containing 12 to 22 carbon atoms with polyoxyethylenated glycerol, hexitan, hexitol, and isohexide and mixtures thereof;

(c) about 1 wt. % to about 10 wt. % of a polymeric glycerol ester component selected from the group consisting of monoesters, diesters, triesters, tetraesters, and pentaesters of polymeric glycerol having a degree of polymerization of 2 to 10 with one to five fatty acids containing 12 to 22 carbon atoms and mixtures thereof; and (d) about 5 wt. % to about 50 wt. % of one or more edible oils.

21. A method according to claim 20 wherein said liquid composition further comprises one or more glycerol diesters selected from the group consisting of glycerol diesters of fatty acids containing 12 to 22 carbon atoms, wherein said one or more glycerol diesters and said glycerol monoester component together comprise about 25 wt. % to about 50 wt. % of said liquid composition.

22. A method according to claim 20 wherein said polyoxyethylene ester component is selected from the group consisting of monoesters of fatty acids containing 12 to 22 carbon atoms with sorbitol, sorbitan, isosorbide ethoxylated with 10 to 25 moles of ethylene oxide per mole.

23. A method according to claim 20 wherein said liquid composition further comprises water in an amount up to about 10 wt. %.

24. A method according to claim 21 wherein said liquid composition further comprises water in an amount up to about 10 wt. %.

25. A method according to claim 22 wherein said liquid composition further comprises water in an amount up to about 10 wt. %.

26. A method according to claim 20 wherein said liquid composition comprises (A) a mixture of (a) about 25 wt. % to about 50 wt. % of a glycerol monoester component selected from the group consisting of glycerol monoesters of fatty acids containing 12 to 22 carbon atoms and mixtures thereof;

(b) about 18 wt. % to about 32 wt. % of a polyoxyethylene ester component selected from the group consisting of monoesters of fatty acids containing 12 to 22 carbon atoms with polyoxyethylenated glycerol, hexitan, hexitol, and isohexide and mixtures thereof;

(c) about 1 wt. % to about 10 wt. % of a polymeric glycerol ester component selected from the group consisting of monoesters, diesters, triesters, tetraesters, and pentaesters of polymeric glycerol having a degree of polymerization of 2 to 20 with one to five fatty acids containing 12 to 22 carbon atoms and mixtures thereof; and (d) about 5 wt. % to about 50 wt. % of one or more edible oils; and (B) water, wherein the weight ratio of component (B) to component (A) is up to 100:1.

27. A method according to claim 26 wherein said component (A) further comprises one or more glycerol diesters of fatty acids containing 12 to 22 carbon atoms, wherein said one or more glycerol diesters and said glycerol monoester component together comprise about 25 wt. % to about 50 wt. % of said liquid composition.

28. A method according to claim 26 wherein said polyoxyethylene ester component selected from the group consisting of monoesters of fatty acids containing 12 to 22 carbon atoms with sorbitol, sorbitan, isosorbide ethoxylated with 10 to 25 moles of ethylene oxide per mole.

29. A method according to claim 20 wherein said polyoxyethylene ester component is polyoxyethylene(20)sorbitan monostearate.

30. A method according to claim 21 wherein said polyoxyethylene ester component is polyoxyethylene(20)sorbitan monostearate.

31. A method according to claim 26 wherein said polyoxyethylene ester component is polyoxyethylene(20)sorbitan monostearate.

32. A method according to claim 27 wherein said polyoxyethylene ester component is polyoxyethylene(20)sorbitan monostearate.

* * * * *